3,435,019
DEACTIVATING RESIDUAL POLYMERIZATION
CATALYST IN POLYPROPYLENE
George A. Goebel, Pompton Plains, and Peter J. Canterino, Towaco, N.J., assignors to Rexall Drug and Chemical Company, Los Angeles, Calif., a corporation of Delaware
No Drawing. Filed Aug. 4, 1965, Ser. No. 477,295
Int. Cl. C08g 20/18, 33/16
U.S. Cl. 260—93.7                   3 Claims This invention is directed to an improved process for the production of crystalline polypropylene. This invention is particularly directed to a process for the production of crystalline polypropylene wherein an improved method is provided for deactivating the residual polymerization catalyst in the polypropylene.

In summary, this invention is directed to the addition of an aqueous solution of an alkaline substance selected from the group consisting of ammonium hyrdoxide, ethylamine, n-propylamine, isobutylamine, hydrazine-hydrate, and phenyl hydrazine to a hot softened polymerized propylene containing residual metal chloride values, whereby the residual catalyst is decomposed by the water into metal residue and hydrochloric acid, and the acid produced thereby is neutralized by the alkaline component in the water solution to give the corresponding chloride salt, which is then removed by volatilization. The term "softened polypropylene" or "polypropylene in a softened condition" is used herein to mean polypropylene heated to a temperature of 160–500° C.

Crystalline polypropylene only has been in commercial production since 1957, but it already appears likely it will rank with polyethylene as a large tonnage, multipurpose polymer. Propylene is generally polymerized using the so-called Ziegler-Natta catalysts, for example, a catalyst obtained by mixing catalytic heavy metal compounds such as titanium trichloride and aluminum chloride with catalytic metal alkyl compounds such as aluminum triethyl and diethylaluminum chloride. These Ziegler-Natta catalysts are stereospecific, i.e., produce a polypropylene having a high degree of crystallinity at least for long portions of the main chain, apparently due to the fact that all of the asymmetric C atoms have the same steric configuration.

While the Ziegler-Natta type catalysts are invaluable for producing crystalline polypropylene, it is well known in the art that residual metal chloride catalyst in the polymer, even in small amounts, impairs to a great degree the physical properties of the polypropylene.

The prior art, therefore, has taught that removal of the residual catalyst is necessary before the polypropylene can be fabricated for commercial usage. As taught in the prior art, purification of the polymer has involved a long and complicated process. One method used to purify the polymer is: washing repeatedly with azeotropic isopropanol heptane wash liquor, containing 0.1–0.5% HCl, substantially free from oxygen and moisture to reduce the polypropylene to a total volatile content of less than 0.1%. The polypropylene powder is then blended with additives in an inert atmosphere to protect it from heat and oxidation and finally extruded to produce the final finished polypropylene product. The wash liquor used in the extraction columns is purified in order that it may be reused therein. The polymer can then be pelletized in an extruder for commercial packaging.

It is, therefore, an object of our invention to eliminate the costly pre-extrusion extraction steps, by providing a means of purifying the polymer simultaneously with the extrusion process.

It is a further object of this invention to provide a rapid method whereby the Ziegler-Natta polymerization catalyst would be rendered innocuous, without actually removing the metal components of said catalyst from the polymer.

We have found that since the polymer contains normally only small amounts of catalyst, it is quite troublesome and expensive to actually remove the polymerization catalyst from the polymer. We have also found that the Ziegler-Natta catalysts can be easily and quickly deactivated simultaneously with the fabrication step, without their removal from the polymer. We have also found that, contrary to prior belief, the presence of the deactivated catalyst does not impair the physical properties of the polypropylene, in the great majority of applications.

The normally solid polyolefins to be treated by the process of this invention are those containing 1–7 parts per thousand (p.p.t.) chlorine as chloride residues from metal chloride catalysts, and especially from metal chloride catalysts with aluminum alkyl chloride cocatalysts. Such polyolefins are well-known, and can be made by processes described in, e.g., Patents 3,075,959, 3,108,-973, 3,096,316, 3,109,838 and 3,109,822.

The invention is particularly useful in treating polypropylenes made with catalysts containing a relatively high percentage of chlorine, e.g., a catalyst made by treating cocrystallized $TiCl_3/AlCl_3$ with diethyl aluminum chloride, as hereinafter described.

This invention is further described, but not limited by the following example.

Example

Polymerization according to the procedure of this example is particularly suitable for use in a pilot plant (about 60 lbs. propylene per hour) and gives a propylene 94–95% insoluble in boiling n-heptane and which has a melt index of 0.01–25 (ASTMD 1238–62T, Condition L), a density of 0.9, and a maximum ash of 0.01%.

The polymerization vessel was a glass-lined 150 gallon stirred autoclave. The unit was jacketed, but actually this was unnecessary, since the reaction does not require heating or cooling through the vessel walls. The reactor head was equipped with inlets for propylene feed and diethylaluminum chloride feed. The $TiCl_3$ feed was a suspension of 66% by weight of activated $3TiCl_3 \cdot AlCl_3$ (co-crystallized) in mineral oil. This suspension was metered by a plunger into the propylene feed line entering the reactor head. The feed rate was about 0.13 lbs. of $3TiCl_3 \cdot AlCl_3$ per hour. The diethylaluminum chloride ("DEAC") was fed to the reactor as a 4% (by weight) solution in propylene, at a rate of about 0.2 lb. of DEAC per hour. The reactor head was also equipped with a vapor port connected to a reflux condenser. A fourth port on the reactor head was used to meter in hydrogen, used for molecular weight control.

The bottom of the reactor was equipped with an automatically timed discharge valve which gave intermittent periods of full line opening. (The intermittent operation helped keep the discharged line clear, but is not absolutely necessary.) The slurry was discharged from this valve to a cyclone separator for flashing propylene. Super-heated propylene is injected into the line from the valve to the separator when necessary to assure sufficient heat to completely evaporate propylene from the polymer.

Liquid propylene is charged to the polymerization vessel at about 150 lbs./hour. Operating continuously, the propylene feed includes about 40–60 (in this example, 60) weight percent of recycled propylene. In this example the polymerization vessel is normally operated such that it contains 100 gallons of a slurry of polypropylene in liquid propylene, or 430 lbs. total. The propylene feed rate and reactor liquid level is such that the average residence of polymer and propylene in the reactor is about 2.8 hours. This level is maintained by balancing conversion rate, propylene feed rate, and slurry discharge rate.

The TiCl$_3$ catalyst component is the type resulting from the reduction of TiCl$_4$ with aluminum, and is an intimate co-dispersion or co-crystallzation of TiCl$_3$ with by-product AlCl$_3$, in a TiCl$_3$:AlCl$_3$ mole ratio of about 3:1. The product is preferably thoroughly ball-milled before use, and to permit substantially continuous feeding to the reactor, and for convenience in storage and handling, it is added as a suspension or paste, of 66 wt. percent $$3TiCl_3 \cdot AlCl_3$$

in highly purified paraffinic mineral oil. The anhydrous diethylaluminum chloride, purchased as a liquid, may be added as such, or, for better control and safety, may be dissolved in an inert liquid such as propylene or a hydrocarbon such as n-hexane. Preferably, and as done in this example, the diethylaluminum chloride is fed to the reactor as a 4 wt. percent solution in propylene, as already described.

The 3TiCl$_3$·AlCl$_3$ component is charged continuously at the rate of substantially 0.08 wt. percent of the total propylene feed. The rate of 3TiCl$_3$·AlCl$_3$ addition is adjusted at a fixed propylene feed rate in order to obtain the desired conversion and corresponding desired solids content in the reactor. The diethylaluminum chloride is fed at a rate to provide a TiCl$_3$:Et$_2$AlCl mole ratio of about 1:1–4.

Hydrogen is fed continuously or intermittently to the polymerization mixture in the autoclave in the known way in order to maintain a concentration in the liquid to achieve the desired molecular weight control.

The polymerization proceeds continuously within the reactor. Although the water jacket for the reaction vessel may be heated initially to start the reaction, this heat source is stopped as soon as polymerization begins. Thereafter the reaction proceeds exothermically, and the propylene diluent boils off into a propylene condenser overhead the reactor, where the propylene is condensed and returned to the reactor at essentially reactor temperature. About 8.5 lbs./hour/per lb. of polymer [of propylene monomer] is vaporized, condensed, and returned in this way. Non-condensibles such as hydrogen passing to the overhead condenser must be balanced in volume so as not to blanket the condenser surface or else vented from the reactor. The reaction temperature is suitably held in the range of 115–180° F. In this example it was about 130° F.

The reaction is permitted to proceed at a rate to provide about 30–60 (in this example, 40) percent solids in the reactor. This amount is fixed by the ratio of catalyst to propylene feed rate, viz., the propylene feed rate with a corresponding catalyst feed rate are set to give the desired conversion, which is this example, is 40%, and thereby the reaction mixture can be made to have a residence time in the reactor of 1–4 hours by adjusting the corresponding reactor slurry volume. The residence time should be adjusted by balancing the feed and discharge rates with the slurry volume. These adjustments are well within the skill of the art, are readily calculated, and require little or no experimentation. A residence time of 1–4 hours is preferred, 1½–2 hours being typical. The 30–60% solids figure is important for several reasons, viz, greater amounts of solids cause difficulty in stirring and in cooling, and there is danger that the polymer particles will fuse together. On the other hand, conversion rate below 30%, although operable, is too low to be economically advantageous.

Although product slurry discharge can be continuous, there is less danger of plugging exit lines if discharge is intermittent, e.g., the exit valve is opened for 0.1–10 seconds every 5–100 seconds, suitably for one second every 10 seconds. Automatic timing equipment is commercially available for any desired discharge cycle, and thus the discharge, even though intermittent, can be considered for practical purposes to be substantially continuous.

Under equilibrium conditions, therefore, the hourly product discharge consists of about 60 lbs. polypropylene product as a suspension of fine particles in about 90 lbs. of liquid propylene, with proportioned amounts of Ti- and Al-containing catalyst residue. The polypropylene portion consists of about 90–95 (more generally 94–95) wt. percent insoluble in boiling n-heptane (the isotactic component), with the balance being amorphous polypropylene.

The polypropylene particles must now be separated from propylene diluent, and this is done in the known way, e.g., by flashing off the propylene in a cyclone separator.

The substantially dry polymer, removed continuously from the cyclone separator, contained 1 to 7 p.p. thousand chlorine as chloride residue, and was charged continuously to a "Sterling" one inch extruder having a length to diameter ratio of 24 to 1 and equipped with electric temperature controls, a vacuum pump, a feed pump storage tank, an injection part, and a devolatilizing vent. The extruder had previously been heated to 350–400° C. and screw speed was set to be 100 r.p.m., so that a single strand was produced at an extrusion rate of about 60 lbs. per hour. As the polymer was charged to the extruder, the extruder vacuum pump started, activating the factor pump, which released the deactivating medium into the extruder. The deactivating medium had previously been prepared as a 4% by weight ammonium hydroxide solution in water, and was stored in the extruder feed pump storage tank. The aqueous ammonium hydroxide flowed into the extruder through the injection port, reacted with the softened polymer and was almost simultaneously volatilized due to the temperature in the extruder. The volatiles were removed through the devolatilizing vent in the upper side of the extruder. The ammonium hydroxide solution was added to the extruder continuously, at a rate so that the amount of the solution being volatilized and vented equaled the amount of solution being added. Actual residence time of the ammonium hydroxide in the extruder, at the extruder conditions described, was less than 30 seconds, as vapor was observed exiting from the vent 5–15 seconds after the flow was started. The rate of addition of deactivator solution is most easily determined experimentally, being dependent on the volume of the extruder, the temperature, screw speed, rate of extrusion, etc. For example, using the extruder above described, 0.2–3 gallons of deactivating solution were used per hour to treat the 60 pounds per hour yield of polypropylene containing 1 to 7 p.p.t. chlorine as chloride residue. Operably, 0.1 to 10 gallons of deactivating solution can be employed per hour for a continuous extrusion of about 60 pounds/hour of polypropylene. This can be decreased or increased proportionately if lesser or greater yields of polymer are planned.

Any alkaline chemical which is reactive with HCl and whose chloride salt is easily volatilized at the extrusion temperature can be employed in the operation of this invention. Examples of eminently suitable substances include: ethylamine, n-propylamine, isobutylamine, hydrazinehydrate, phenylhydrazine, and others.

The alkaline substance can be employed in a 2–15% by weight aqueous solution, and preferably a 2–10% by weight aqueous solution.

The operable temperature to which the polypropylene is heated is between the softening temperature of the polypropylene, i.e., 160–170° C. and about 500° C. Preferably, the polypropylene is heated in the extruder being used to between 300–500° C., or whatever temperature is most convenient to the plastic processor.

The method of deactivating residual Ziegler-Natta catalysts is operable any time. These catalysts are used in α-olefin polymerizations, i.e., for producing polyethylene, polypropylene block copolymers, polypropylene random copolymers (wherein the comonomer employed may be any used in the art, and is not limited to an α-olefin monomer), or the polypropylene homopolymer described in the example supra.

Having fully described our invention, what is claimed is:

1. In the process of polymerizing propylene using a titanium chloride/aluminum trichloride/diethylaluminum chloride catalyst, the method of deactivating residual catalyst which comprises heating the polypropylene to a temperature of 160 to 500° C., and then contacting in an extruder said polypropylene while in a softened condition with a 2–15% by weight aqueous ammonium hydroxide in the ratio of 0.1–10 gallons of said aqueous ammonium hydroxide per 60 pounds of polypropylene, evaporating from the extruder the water and ammonium chloride formed from the decomposition of the catalyst residue, and extruding the thus treated polypropylene from the extruder.

2. The method according to claim 1, whereby 0.2 to 3 gallons per hour of said aqueous ammonium hydroxide solution are added continually to polypropylene being extruded at 60 pounds per hour from a one inch extruder having a screw speed of 100 r.p.m., and a length to diameter ratio of 24 to 1.

3. In the process for polymerizing an α-olefin using a Ziegler-Natta polymerization catalyst, the method of deactivating residual catalyst in the polymerized α-olefin which comprises heating the poly-α-olefin to a temperature of 160° to 500° C., contacting in an extruder said poly-α-olefin while in a softened condition with an aqueous alkaline solution containing 2–15% by weight of an alkaline substance selected from he group consisting of ammonium hydroxide, ethylamine, n-propylamine, isobutylamine, hydrazinehydrate and phenyl hydrazine in the ratio of 0.1–10 gallons of said aqueous alkaline solution per 60 pounds of poly-α-olefin, volatilizing from the extruder the water and resulting chloride salt of the alkaline substance formed from the decomposition of the catalyst residue and extruding the thus treated poly-α-olefin from the extruder.

References Cited

UNITED STATES PATENTS 3,012,003  12/1961  Speyer.

JOSEPH L. SCHOFER, *Primary Examiner.*

L. EDELMAN, *Assistant Examiner.*

U.S. Cl. X.R.

260—94.9, 88.2